(12) United States Patent
Fong

(10) Patent No.: US 6,607,360 B2
(45) Date of Patent: Aug. 19, 2003

(54) CONSTANT PRESSURE PUMP CONTROLLER SYSTEM

(75) Inventor: John J. Fong, Lake Forest, CA (US)

(73) Assignee: ITT Industries Flojet, Foothill Ranch, CA (US)

( * ) Notice: Subject to any disclaimer, the term of this patent is extended or adjusted under 35 U.S.C. 154(b) by 0 days.

(21) Appl. No.: 09/907,139

(22) Filed: Jul. 17, 2001

(65) Prior Publication Data
US 2003/0017055 A1 Jan. 23, 2003

(51) Int. Cl.$^7$ .................................................. F04B 49/06
(52) U.S. Cl. ...................... 417/44.9; 417/44.2
(58) Field of Search .............................. 417/44.9, 44.2, 417/44.1, 44.3, 44.11; 73/861.58, 861.47, 744, 745

(56) References Cited

U.S. PATENT DOCUMENTS

| | | | |
|---|---|---|---|
| 3,985,467 A | * 10/1976 | Lefferson | 417/44.1 |
| 4,433,321 A | * 2/1984 | Widdowson | 338/42 |
| 4,484,173 A | * 11/1984 | Everett | 338/39 |
| 4,540,349 A | 9/1985 | Du | |
| 4,581,941 A | * 4/1986 | Obermann et al. | 73/862.474 |
| 5,158,210 A | 10/1992 | Du | |
| 5,170,912 A | 12/1992 | Du | |
| 5,230,443 A | 7/1993 | Du | |
| 5,350,083 A | 9/1994 | Du | |
| 5,361,943 A | 11/1994 | Du | |
| 5,435,466 A | 7/1995 | Du | |
| 5,464,327 A | * 11/1995 | Horwitz | 417/44.2 |
| 5,520,517 A | * 5/1996 | Sipin | 417/44.11 |
| 5,540,556 A | 7/1996 | Du | |
| 5,577,890 A | * 11/1996 | Nielsen et al. | 417/44.2 |
| 5,580,221 A | * 12/1996 | Triezenberg | 417/44.2 |
| 5,613,834 A | 3/1997 | Du | |
| 5,664,940 A | 9/1997 | Du | |
| 5,672,049 A | * 9/1997 | Ciurlo | 417/44.9 |
| 5,725,358 A | * 3/1998 | Bert et al. | 417/44.2 |
| 5,749,709 A | 5/1998 | Du | |
| 5,941,690 A | * 8/1999 | Lin | 417/44.2 |

FOREIGN PATENT DOCUMENTS

EP         285773 A   * 10/1988   .................. 73/744

OTHER PUBLICATIONS

Aquatec Water Systems: "Aquajet RV Series", webpage dated Oct. 29, 2001, 2 pages.
ITT Industries Products List, webpage dated Oct. 29, 2001, 8 pages.

* cited by examiner

Primary Examiner—Cheryl J. Tyler
(74) Attorney, Agent, or Firm—Stetina Brunda Garred & Brucker

(57) ABSTRACT

A constant-pressure pump controller system for maintaining a substantially uniform discharge pressure of liquid output from a pump operated by an electric motor and where liquid is delivered to a plurality of simultaneously-operating downstream outlets. The system provides a pressure transducer for sensing discharge pressure from the pump, and includes a piston bearing a magnet for Hall effect interaction. To accomplish Hall effect sensing, an electric current carrier is situated to interact with the magnet for production of Hall voltage which is monitored by a voltage sensor in communication with a controller that regulates motor speed in accord with Hall-effect sensed need through pulse width modulation in response to the voltage value according to proportional integral derivative methodology. Finally, a pump input voltage sensor and regulator maintain a constant voltage output to the pump should voltage input be variable.

13 Claims, 4 Drawing Sheets

CONSTANT PRESSURE PUMP CONTROLLER SYSTEM

CROSS REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates in general to pumps for pumping liquid, and in particular to a constant-pressure pump controller system for maintaining a substantially uniform discharge pressure of liquid output from the pump generally irrespective of the number of open downstream outlets drawing such liquid delivered by the pump. Various liquid dispensing systems rely upon one or more pumps to accomplish liquid delivery at a plurality of sites, with many such systems delivering water or water-based liquid for a myriad of uses. Examples of such applications include motor-home water systems, spray systems such as car-wash wands, carpet-cleaning applicators, spray-mist cooling units, auto-service coolant-change reservoirs, and/or various pumps such as transmission oil filter pumps, water pressure booster pumps, carbonator pump, foam application pumps, road compactor spray pumps, street sweeper post-suppressions pumps, and the like. In addition to the delivery of water-containing products, other liquids such as chemicals, fuels, beverages, etc. may be supplied to an end-use site by utilization of a pump.

While certain liquid delivery requirements involve transfer thereof to only one location and therefore involve only a single downstream opening for liquid flow, many systems have a plurality of downstream openings available for simultaneous flow supply at a number of sites. One example of such a system is that found in many well-equipped motor homes that include kitchen and bathroom sink faucets, a shower and toilet, and possibly an outside faucet. When multiple liquid outlets are served simultaneously, as where two or more of the above-exemplified facilities are calling for water, a significant pressure drop automatically occurs at each such outlet since a traditional pump does not change operating parameters to increase delivery pressure. Because of customer dissatisfaction with such conditions, relatively expensive pressure sensors have been developed to adjust pump-motor speed in relation to pressure demand. These prior-art sensors generally include complex piezoresistive regulators operable in conjunction with elaborate built-in amplifiers and intricate temperature compensation networks to permit pump-motor speed control. However, the complexity of such devices, coupled with their expense, many times fails to provide a practical long-term solution over the many potential installations that can beneficially impact users.

In view of such deficiencies, it is apparent that a need is present for a relatively non-complicated pump controller system that can maintain pressure throughout a liquid delivery network at a reasonable cost and over a reasonable period of time without breakdown. In accord therewith, a primary object of the present invention is to provide a pump controller system that continually senses the pressure of liquid moving therefrom and correspondingly adjusting the speed of the pump motor to reflect pressure variations as they occur.

Another object of the present invention is to provide a pump controller system that employs the Hall effect in modifying voltage to achieve regulation of pump-motor speed.

Yet another object of the present invention is to provide a pump controller system wherein pressure value can be changed to correspond with pressure need for any particular application.

These and other objects of the present invention will become apparent throughout the application which now follows.

BRIEF SUMMARY OF THE INVENTION

The present invention is a constant-pressure pump controller system for maintaining a substantially uniform discharge pressure of liquid output from a pump operated by an electric motor and where liquid is to be delivered to a plurality of simultaneously-operating downstream outlets. The system comprises a pressure transducer for sensing discharge pressure from the pump, and includes a housing with an interior chamber, an opening to the chamber, and a flexible seal covering the opening to the chamber. A piston, which is longitudinally movable toward and away from the flexible seal and biased with a pressure member toward the flexible seal, is disposed in the chamber and bears a magnet for Hall effect interaction. To accomplish Hall effect sensing, an electric current carrier is situated to interact with the magnet for production of Hall voltage which is monitored by a voltage sensor in communication with a controller that regulates motor speed through pulse width modulation in response to the voltage value according to proportional integral derivative methodology. Finally, a pump input voltage sensor and regulator maintain a constant voltage output to the pump should voltage input be variable.

As is recognized, the Hall effect develops a transverse electric field in material carrying an electric current and positioned in a magnetic field perpendicular to the current. Depending upon passing-liquid pressure on the flexible seal in the present invention and therefore the axial movement and resulting position of the magnet-bearing piston, the linear displacement of the piston and thus the magnetic field in relation to the current provides a variable voltage signal for the controller to accelerate and/or decelerate the pump motor in direct response to piston movement and, thereby, indirect response to liquid pressure. This employment of the Hall effect provides maintenance of pressure of liquid flow from a plurality of downstream outlets that are simultaneously opened, yet achieves a relatively simple and cost effective manner for attaining such pressure maintenance.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
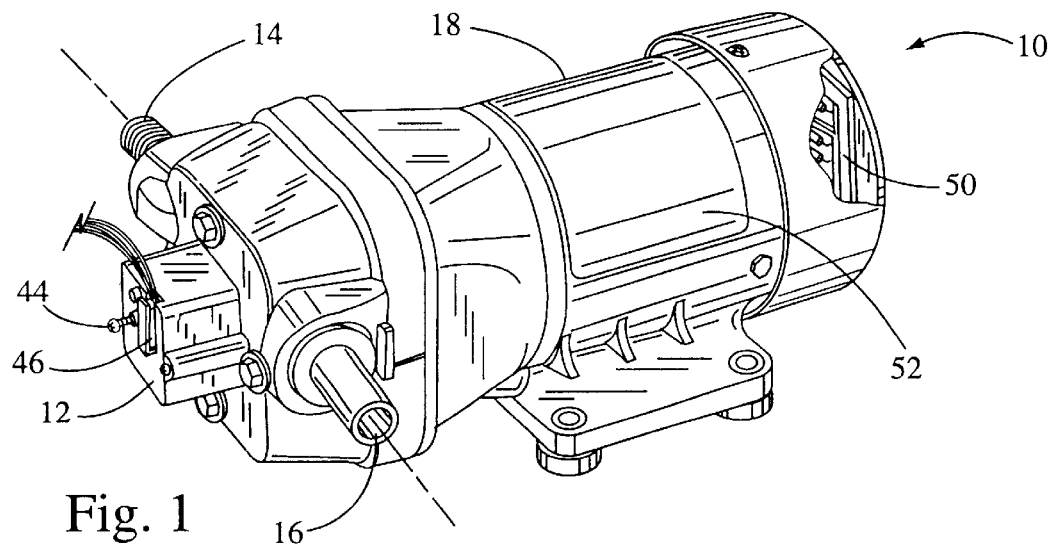
FIG. 1 is a perspective view of a liquid pump.
Figure 2:
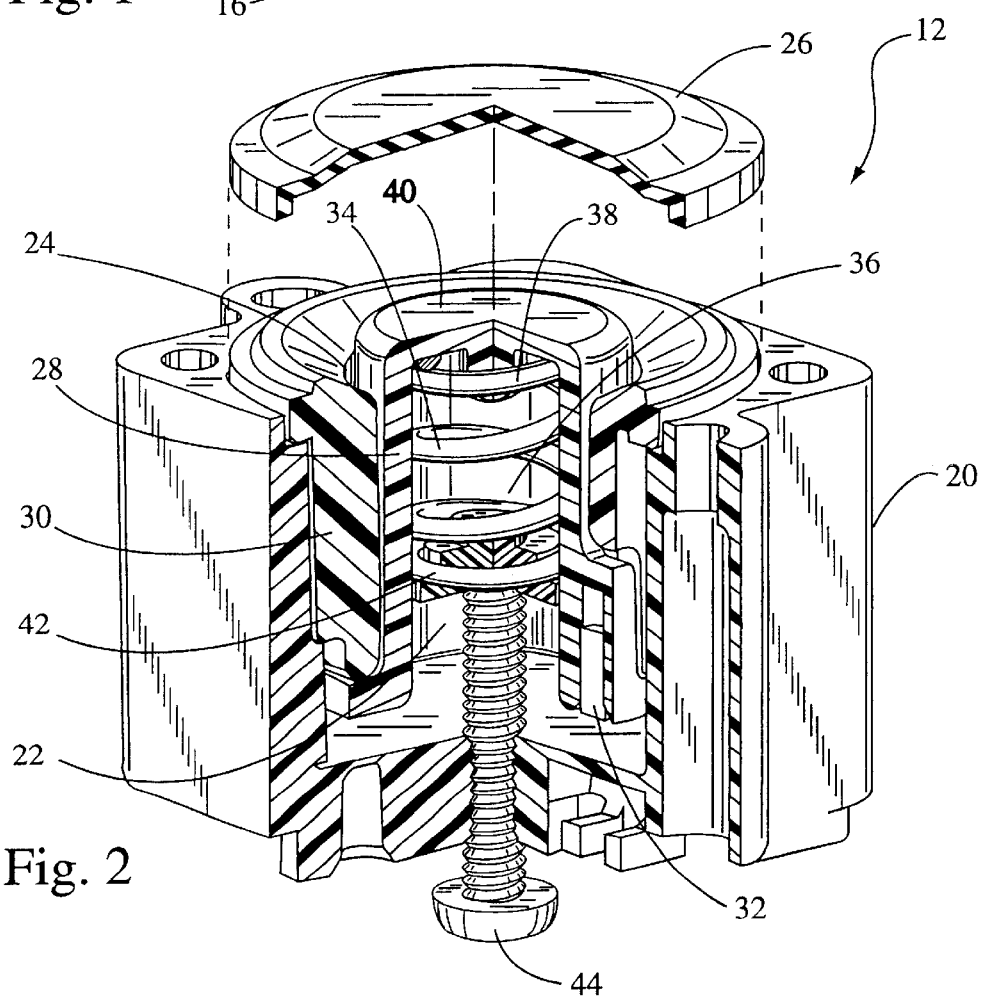
FIG. 2 is an exploded cut-away view of a pressure transducer for the pump.

Referring first to FIGS. 1 and 2, a liquid pump 10 is illustrated. The pump 10 includes a pressure transducer 12, a liquid inlet 14, a liquid outlet 16, and a housing 18 within which is disposed a conventional electric motor 52 and a motor-speed controller 50. In the preferred embodiment, the motor speed controller 50 comprises a micro-processor controller which, as will be explained below in more detail, receives electrical input signals from the pressure transducer 12 to produce output signals to the motor 52 to control motor speed. As particularly shown in FIG. 2, the transducer 12 has a housing 20 with an interior chamber 22 and an opening 24 to the chamber 22. A flexible seal 26 such as fabricated of rubber covers and seals the opening 24. Within the chamber 22 is a piston 28 slidably situated within a piston guide 30 such that the piston 28 can longitudinally move toward and away from the seal 26. A magnet 32 is secured with the piston 28. A coil spring 34 is disposed within the chamber 22 and fits within the hollow interior 36 of the piston 28 such that one end 38 of the spring 34 is in contact with the piston 28 beneath the distal surface 40 thereof for biasing the piston 28 toward the seal 26. The other end 42 of the spring 34 cooperates with an exteriorly accessible screw 44 such that rotation of the screw 44 adjusts spring tension and thus spring pressure coil impact.

Figure 3:
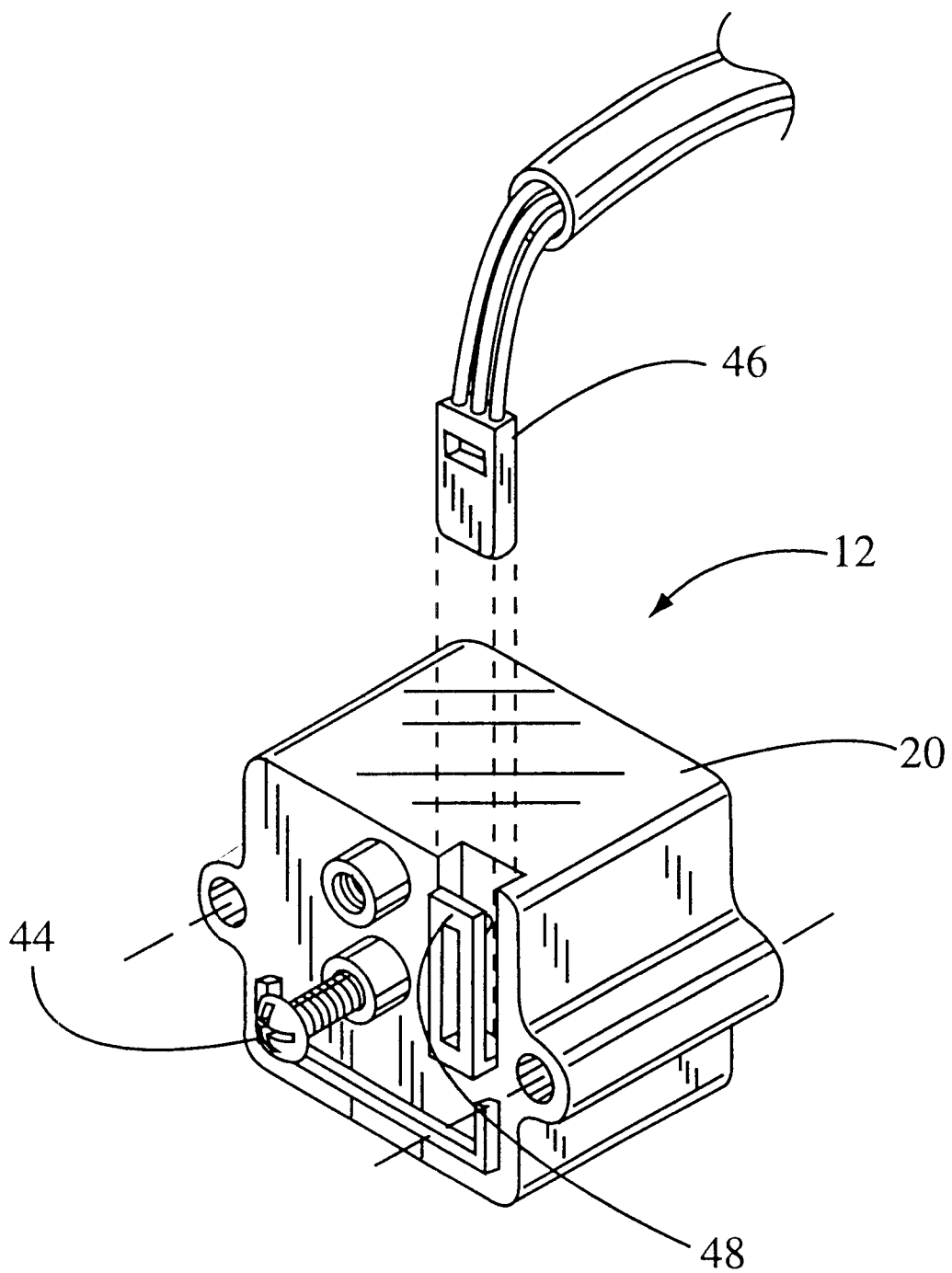
FIG. 3 is a perspective view of the pressure transducer of FIG. 2 showing attachment thereto of a current carrier.
Figure 4:
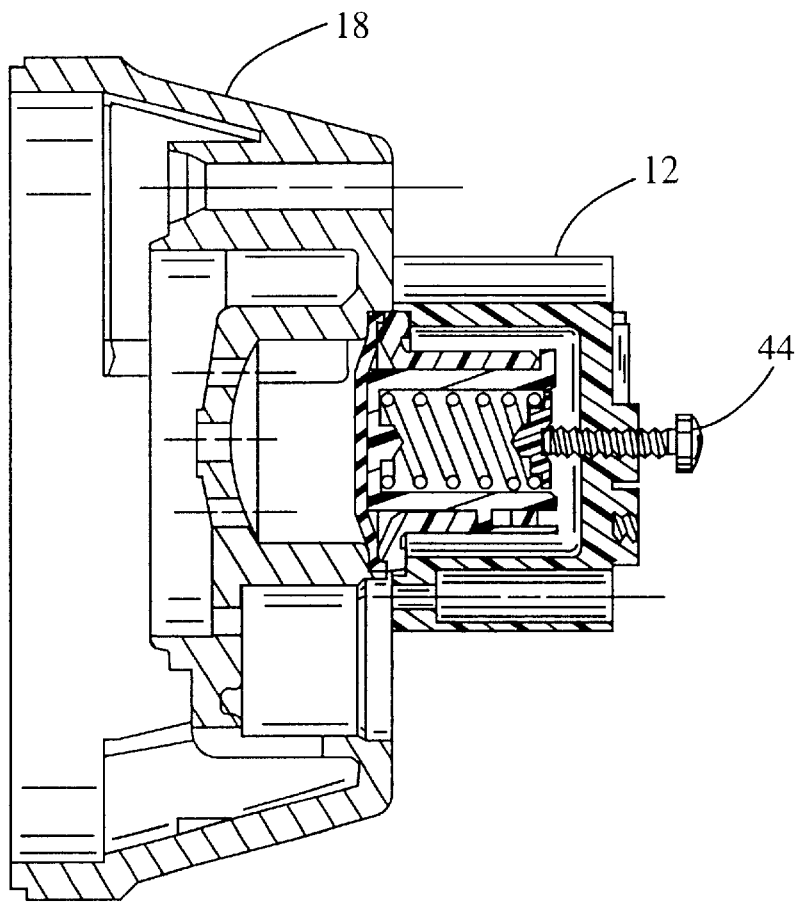
FIG. 4 is a side elevation view in section of the transducer of FIG. 2 integrally in place with pump motor housing.
Figure 5:
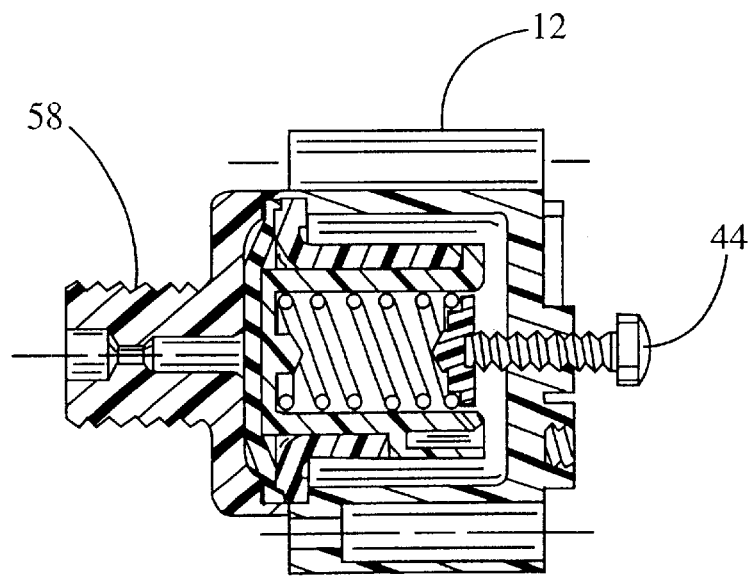
FIG. 5 is a side elevation view in section of a transducer according to FIG. 2 except with a threaded attachment for selective securement to a liquid pump.
Figure 6:
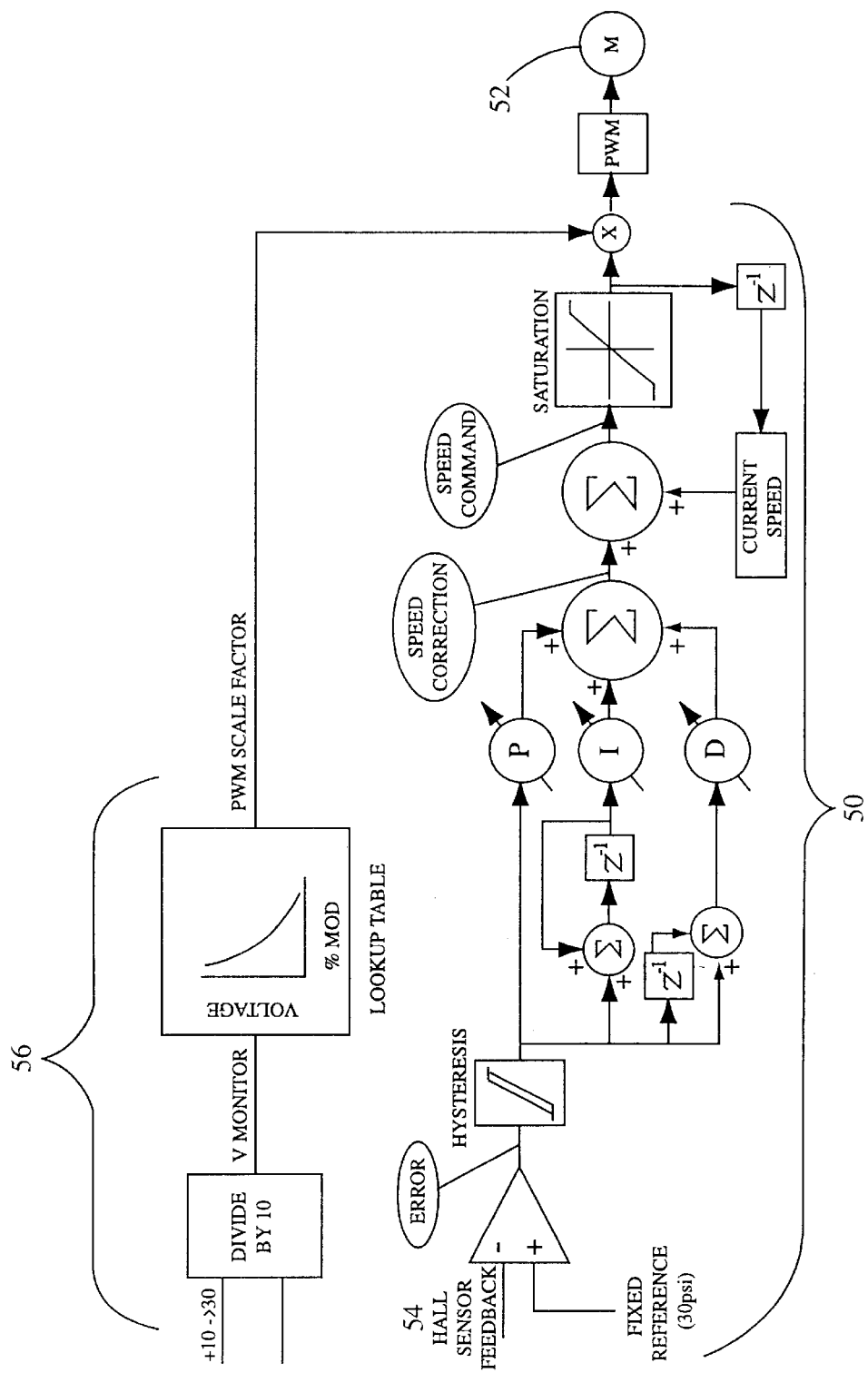
FIG. 6 is a schematic diagram showing Hall effect and controller interactions.

As particularly shown in FIGS. 1 and 3, a Hall effect electrical current carrier 46 preferably encapsulated in a polymer material is releasably attached to the transducer 12 within a spring-clip mount 48 of the transducer housing 20. Referring to FIG. 6, the controller 50 is in communication with the motor 52 and with the Hall voltage sensor 54 for regulating motor speed without hysteresis through pulse width modulation in response to the Hall voltage according to standard proportional integral derivative methodology (P, I, D as schematically identified in FIG. 6). A standard voltage input sensor and voltage regulator unit 56 senses variable voltage input and applies a pulse width modulation factor as known in the art to thereby maintain a constant voltage output. The look-up table there shown is provided as firmware of the printed circuit board operating the controller 50. As particularly illustrated in FIGS. 4 and 5, the transducer 12 can be a permanent integral part of the motor/controller housing 18 (FIG. 4), or it can be constructed with a threaded connection 58 (FIG. 5) for selective integral addition to existing pumps where Hall-effect operation is desired. Although in the preferred embodiment a Hall effect sensor is utilized, those skilled in the art will recognize that other linear transducer sensors are contemplated herein and for purposes of this application will be collectively defined as Hall effect sensors. For both power conservation and motor protection, standard low-voltage and high-voltage sensor and cut-off devices are preferably included in the electrical circuitry to respectively preserve battery life and to protect motor circuitry. Additionally, and related to pump protection, when pump activation occurs, preferably a conventional ramp-up process is automatically employed to thereby permit the pump to incrementally reach full service.

In operation, liquid enters through the liquid inlet 14, pressuredly contacts and passes the flexible seal 26, and exits the liquid outlet 16 for downstream delivery to faucets or other outlets of a liquid deliver system (not shown). When entering-liquid pressure is sufficient to force the piston 28 rearwardly against the biasing force of the spring 34 (as adjusted by the screw 44), Hall effect interaction senses that no additional motor speed is required for liquid pressure maintenance. Conversely, when entering-liquid pressure is insufficient to force the piston 28 rearwardly, as when a number of downstream outlets are calling for liquid delivery, Hall effect interaction is such that piston movement (and resulting magnet position) activates the controller 50 which in turn activates the motor 52 according to the circuitry of FIG. 6 to thereby increase the pressure of exiting liquid. In this manner, the pump controller system here defined continually senses the pressure of liquid moving therefrom and correspondingly adjusts the speed of the pump motor to reflect pressure variations as they occur.

While an illustrative and presently preferred embodiment of the invention has been described in detail herein, it is to be understood that the inventive concepts may be otherwise variously embodied and employed and that the appended claims are intended to be construed to include such variations except insofar as limited by prior art.

What is claimed is:

1. A constant-pressure pump controller system for maintaining a substantially uniform discharge pressure of liquid output from a pump operated by an electric motor and delivered to a plurality of simultaneously-operating downstream outlets, the system comprising:
    a) a pressure transducer for sensing discharge pressure from the pump, the transducer comprising:
       i) a housing with an interior chamber and an opening to the chamber;
       ii) a flexible seal covering the opening to the chamber;
       iii) a piston disposed in the chamber, said piston longitudinally movable toward and away from the flexible seal and bearing a magnet for Hall effect interaction; and
       iv) a pressure member for pressuredly biasing the piston toward the flexible seal;
    b) an electric current carrier situated for Hall effect interaction with the magnet and production of Hall voltage;
    c) a Hall voltage sensor;
    d) a controller in communication with the motor and with the Hall voltage sensor for regulating motor speed through pulse width modulation in response to said Hall voltage according to proportional integral derivative methodology; and
    e) a pump input voltage sensor and voltage regulator for maintaining a constant voltage output to the pump from a variable voltage input source.

2. A constant-pressure pump controller system as claimed in claim 1 additionally comprising a piston guide member disposed within the chamber of the housing and substantially surrounding the piston.

3. A constant-pressure pump controller system as claimed in claim 1 wherein the pressure member is a coil spring positioned within the chamber of the housing and wherein one end of said spring is in contact with the piston.

4. A constant-pressure pump controller system as claimed in claim 3 additionally comprising an adjustor member for regulating pressure of the spring.

5. A constant-pressure pump controller system as claimed in claim 4 wherein the adjustor member is an exteriorly accessible screw for increasing or decreasing spring coil impact.

6. A constant-pressure pump controller system as claimed in claim 1 additionally comprising an adjustor member for regulating biasing pressure of the pressure member.

7. A constant-pressure pump controller system as claimed in claim 1 additionally comprising a spring clip mount at an exterior site of the housing for releasably retaining the electric current carrier on said housing.

8. A constant-pressure pump controller system as claimed in claim 1 wherein the pressure transducer is permanently integral with said system.

9. A constant-pressure pump controller system as claimed in claim 1 wherein the pressure transducer is removably integral with said system.

10. A constant-pressure pump controller system as claimed in claim 1 additionally comprising a low-voltage sensor and power cut-off for terminating electrical power to the pump upon sensing a predetermined voltage value.

11. A constant-pressure pump controller system as claimed in claim 10 additionally comprising a high-voltage sensor and power cut-off for terminating electrical power to the pump upon sensing a predetermined voltage value.

12. A constant-pressure pump controller system as claimed in claim 1 additionally comprising a high-voltage sensor and power cut-off for terminating electrical power to the pump upon sensing a predetermined voltage value.

13. A constant pressure pump controller system for maintaining a substantially uniform discharge pressure of liquid output from a pump operated by an electric motor and delivered to one or more downstream outlets, the system comprising:

a pressure transducer communicating with the liquid output from said pump having a spring disposed within a piston, said piston being adapted to axially move against a force of said spring disposed therewithin in response to sensing changes in the pressure of the liquid output from the pump, the pressure transducer having a housing with an interior chamber;

a diaphragm disposed within said chamber, wherein one side of which is disposed to the liquid output from said pump and the other side of which is connected to said piston;

the spring biasing said piston toward said diaphragm;

a sensor in proximity to said piston to convert the piston movement into a variable voltage signal; and a controller electrically connected between said sensor and said motor to vary the speed of said motor in response to said variable voltage signal received from said sensor.

* * * * *